(12) United States Patent
Aponte et al.

(10) Patent No.: US 6,274,818 B1
(45) Date of Patent: Aug. 14, 2001

(54) UNIVERSAL CABLE DESIGNATION/RETAINER ASSEMBLY

(75) Inventors: Luis A. Aponte, Andover; Mark Benda, Highland Lakes; David S. DeVincentis, Flanders; Michael J. Thayer, Denville, all of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/334,855

(22) Filed: Jun. 17, 1999

(51) Int. Cl.[7] ................................................. H02G 3/04
(52) U.S. Cl. ............................................................ 174/97
(58) Field of Search ................................ 138/115, 116, 138/117; 174/97, 101

(56) References Cited

U.S. PATENT DOCUMENTS 3,786,171 * 1/1974 Shira ........................................ 174/48
3,862,523 * 1/1975 Eaton ...................................... 174/97
4,269,231 * 5/1981 Happer ................................... 174/97

* cited by examiner

Primary Examiner—Shawn Riley
(74) Attorney, Agent, or Firm—Duane, Morris & Heckscher LLP

(57) ABSTRACT

A cable retainer assembly for retaining cables in a cable trough includes an elongated member that can be detached and secured to a trough. The member has a receptacle disposed at least partially along a length of the member. In one embodiment, the receptacle is a U-shaped channel which extends along the length of the elongated member. A retainer includes a flange that can be inserted in the receptacle and is sidable along the length of the receptacle. A second channel is provided for detachably securing the elongated member to a cable trough. A third channel may be provided on a front face of the elongated member for retaining a designation chart. The chart may be marked to indicate cable designations.

16 Claims, 4 Drawing Sheets

UNIVERSAL CABLE DESIGNATION/RETAINER ASSEMBLY

FIELD OF THE INVENTION

The invention generally relates to apparatus and methods for retaining and designating cables in a cable trough.

BACKGROUND OF THE INVENTION

Devices used to designate and secure cable arrays in cable troughs are well known. In a typical cable retainer/designation assembly, designation strips and cable retainers are separable components which must be customized to mate with each other as well as with existing cable troughs.

Cable retainers can either be formed integrally with cable troughs or can be provided as discrete units that are affixed to the cable trough at the point of system installation. When cable retainers are formed integrally with a trough, the system provides little, if any, flexibility for varying the number or position of retainers with respect to the trough. Further, if an individual retainer breaks, the entire trough assembly must be replaced. On the other hand, cable retainers that are separately provided and installed on-site, may require cable troughs to be individually machined in order to secure the retainers at preferred locations along the troughs. In either case, there are undesirable costs and time required for the installation and maintenance of retainer assemblies.

Designation strips are used to identify cable arrays routed through cable troughs. These devices typically include the means for mounting a replaceable chart which can be marked to identify the cable arrays. The designation strips are typically resilient snap-on devices that are fitted over the front wall of a cable trough and engage the top and bottom longitudinal edges thereof. When designation strips are used on the same cable troughs as with cable retainers, the strips must be machined or otherwise modified to avoid interference with the retainers. Again, the time and expense required to individually fit each designation strip to a cable trough at each installation site is prohibitive.

More flexible solutions are desired, for performing both the retaining and designation functions.

SUMMARY OF THE INVENTION

The present invention provides an assembly used to retain and designate cables in a cable trough. The assembly includes an elongated member or designation strip that can be detached and secured to a cable trough. The designation strip has a receptacle disposed at least partially along its length. The assembly includes one or more retainers that can be detached and inserted in the receptacle.

BRIEF DESCRIPTION OF THE DRAWINGS

These and other features and advantages of the invention are more fully disclosed or rendered apparent from the following description of certain preferred embodiments of the invention, that are to be considered together with the accompanying drawings wherein like numbers refer to like parts and further wherein.

DETAILED DESCRIPTION OF THE PREFERRED EMBODIMENT

Figure 1:
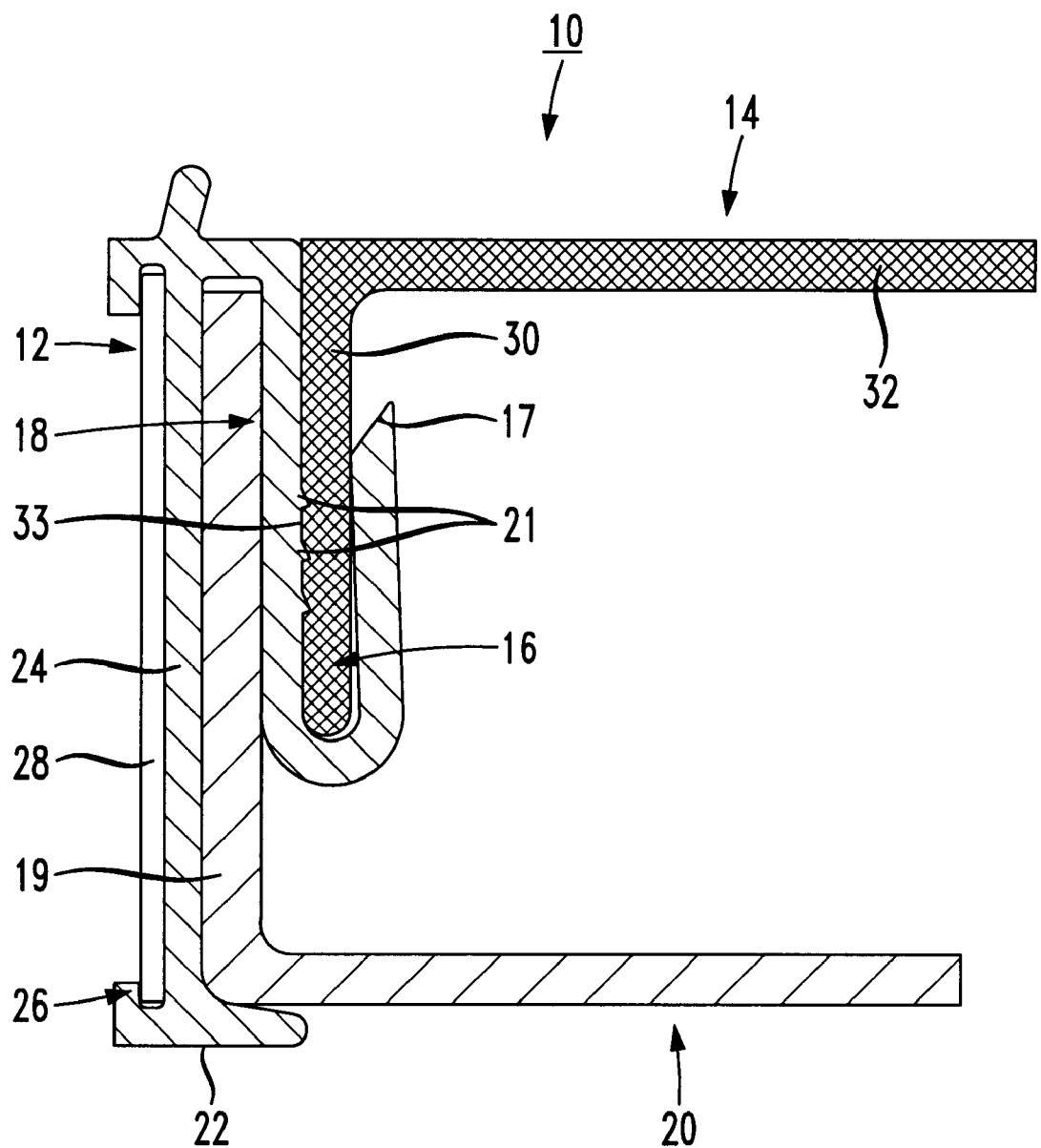
FIG. 1 is a cross-section end-elevational view of a cable designation/retainer assembly according to the invention, secured to a cable trough.
Figure 2:
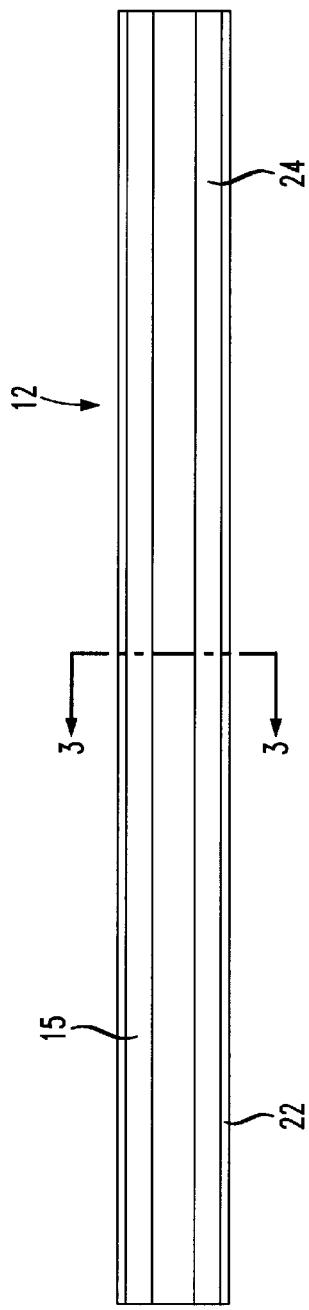
FIG. 2 is a front plan view of the designation strip of FIG. 1.
Figure 3:
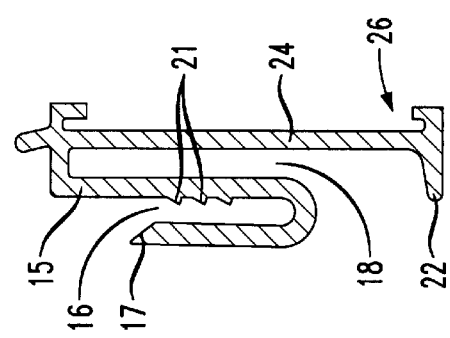
FIG. 3 is a cross-section end-elevational view of a designation strip as shown in FIG. 2, taken along section line 3—3.

Referring to FIG. 1, a cable designation/retainer assembly 10, according to the invention includes a designation strip 12 that can be detached and secured to cable trough 20, and includes a receptacle or other means for detaching and securing one or more retainers 14 to the designation strip. More particularly, with reference to FIGS. 2 and 3, designation strip 12 is an elongated member having two U-shaped channels 16,18 that are separated by a common longitudinal strip 15 and together with front wall 24 define a designation strip 12 having a substantially S-shaped cross-section. Channel 16 has an upward facing opening and is designed to detachably receive one or more retainers 14. A bevel 17 is provided along the free edge of channel 16, and facilitates the insertion of a retainer 14 into the channel 16. The channel 16 is designed to resiliently deflect upon insertion of a retainer 14, and engages the retainer with sufficient force to prevent the retainer from being easily dislodged. A plurality of teeth, grooves, ridges, ramps or equivalent features 21 may also be provided on an inside surface of channel 16 to securely grip retainer 14. Complementary features (e.g., teeth, lands, grooves, ramps and the like) may likewise be provided on retainer 14. In the exemplary embodiment, ramps 33 interlock with channel teeth 21. It will be understood by those skilled in the art, that any combination of gripping surfaces known in the art may be used at the interfacing surfaces of retainer 14 and channel 16.

Channel 18 is provided for detaching and securing designation strip 12 to the wall of a cable trough 20. Channel 18 has a downward facing opening which is adapted to be fitted over the wall 19 of a cable trough 20, as shown in FIG. 1. A lip 22 extends perpendicularly from a bottom edge of the front wall 24 of channel 18. The lip 22 is designed to extend under the bottom edge of trough 20 to secure the designation strip.

Designation strip 14 may also include means for retaining a designation chart 28. In the embodiment shown, the retaining means includes a C-shaped channel 26 extending longitudinally along the face of front wall 24. The channel 26 is shaped to receive a designation chart 28 which is sidably inserted into channel 26, and may be labeled to identify cables housed in the cable trough 20. The designation chart 28 may be formed from any material which can be readily marked to indicate cable designations and is preferably formed from paperboard. Alternative means for securing a designation chart to the designation strip are also contemplated within the scope of the invention, and include, but are not limited to, hooks, hook and loop fasteners (e.g., "VELCRO®"), slotted apertures, spring clips, adhesives, mechanical fasteners, and equivalent structures.

The designation strip 12 can be formed from any material having suitable combined characteristics of resiliency and rigidity, and may be formed as a unitary extrusion of a polymer, such as polyvinyl chloride (PVC). The extruded designation strip 12 can be readily cut to any desired length for mounting to a cable trough of corresponding length.

Figure 4A:
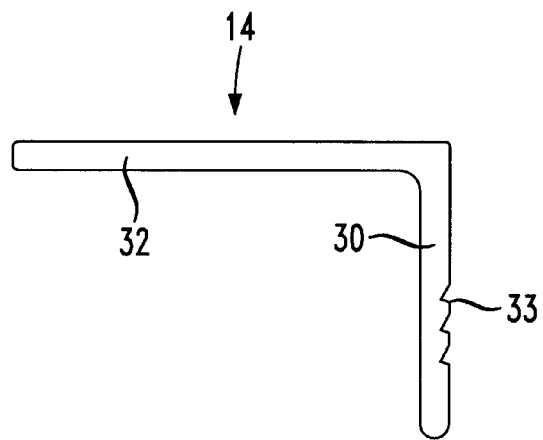
FIG. 4a is a side elevational view of the retainer shown in FIG. 1.
Figure 4B:
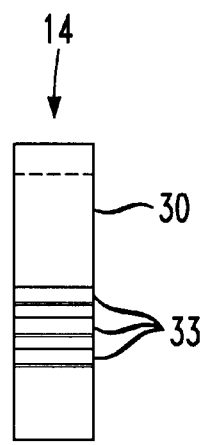
FIG. 4b is a front elevation view of the retainer of FIG. 4A.
Figure 5:
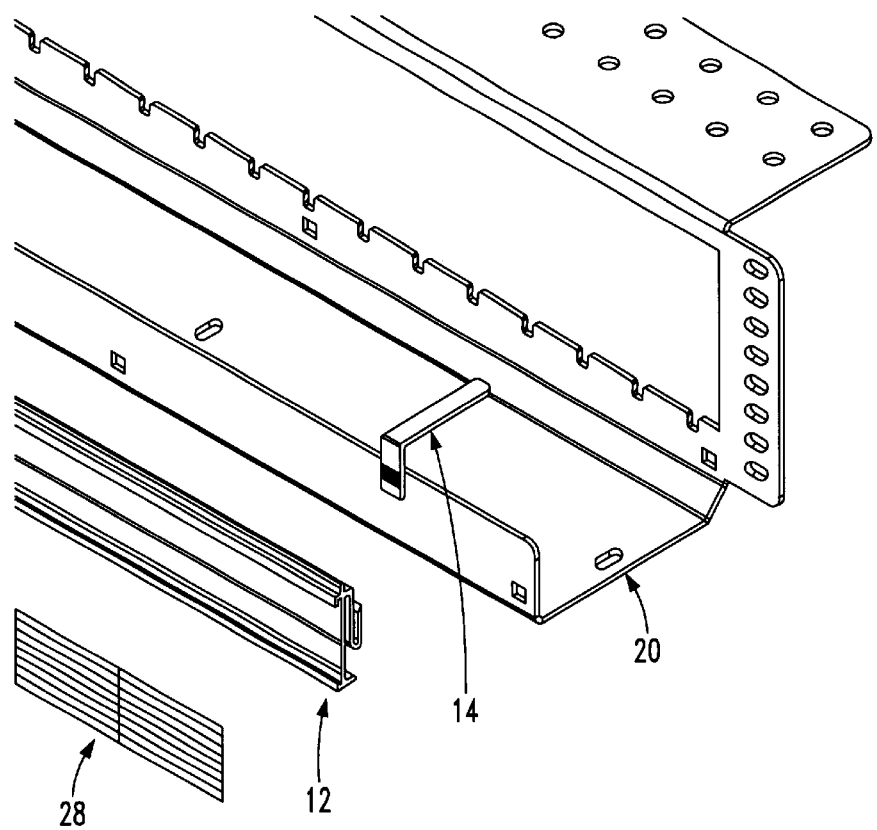
FIG. 5 is an exploded isometric view of a cable designation/retainer assembly according to the invention.
Figure 6:
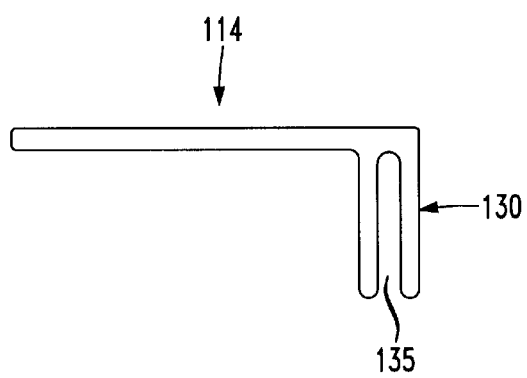
FIG. 6 is a side elevation view of an alternative embodiment of the retainer shown in FIG. 1.

Referring to FIGS. 4a, 4b, retainer 14 is defined by an L-shaped cross-section. The retainer 14 includes a first portion or flange 30 which is engageable with designation strip 12. Flange portion 30 preferably comprises a plate which is insertable into channel 16. Alternatively, as shown in FIG. 6, a retainer 114 may be provided, and includes a first portion 130 defining a receptacle 135 that can be engaged with a complementary projection provided in designation strip 12.

Retainer 14 can be engaged with channel 16 and is slidable so that it can be easily repositioned at any location along the length of designation strip 12. The number of retainers 14 used in the assembly can also be customized to meet a particular user's needs. When the retainer 14 is engaged with designation strip 12, a second portion 32 extends perpendicularly to designation strip 12. By virtue of this arrangement, when the designation strip 12 is secured to a cable trough 20, portion 32 extends over the cable trough to retain any cables located therein.

A designation strip 12 provided in accordance with the invention provides a number of advantages. The integrally formed channel design reduces the number of components previously required using separate structures to perform the designation and retention functions. The apparatus provides improved flexibility, as compared to prior known devices, by allowing any number and position of retainers to accommodate any cabling trough configuration. The adaptability of the system eliminates the need for any machining and/or other permanent on-site modifications previously required to install and customize a trough retainer system. Finally, the detachable retainers are less susceptible to breakage than prior constructions, that included cable troughs having integrally formed retaining devices.

The invention is not limited to the precise constructions herein disclosed and shown in the drawings as examples, and also encompasses such modifications and equivalents that are met by the appended claims. Moreover, the claims are to be construed broadly to include other variations and embodiments of the invention which can be made by those skilled in the art.

What is claimed is:

1. An assembly comprising:
    an elongated member that can be detached and secured to a trough, the member having a receptacle disposed at least partially along a length thereof; and
    at least one retainer having a flange that fits in the receptacle for detaching and securing the retainer in the receptacle, wherein each retainer is slidably movable within the receptacle along at least a portion of the length of the elongated member.

2. The assembly of claim 1 wherein the receptacle includes one or more features for gripping the flange of the retainer.

3. The assembly of claim 2, wherein the features are ridges, ramps, teeth or grooves.

4. The assembly of claim 1 wherein the flange of each retainer includes one or more features for gripping the receptacle.

5. The assembly of claim 4, wherein the features are ridges, ramps, teeth or grooves.

6. An assembly comprising:
    an elongated member that can be detached and secured to a trough, the member having a receptacle disposed at least partially along a length thereof; and
    at least one retainer having a flange that fits in the receptacle for detaching and securing the retainer in the receptacle, wherein the receptacle comprises a first channel and the elongated member further includes a second channel for detaching and securing the elongated member to the trough.

7. The assembly of claim 6 wherein the first and second channels have oppositely facing openings and are separated by a common longitudinal strip.

8. The assembly of claim 6 wherein the elongated member further includes a third channel for detaching and securing a designation chart.

9. The assembly of claim 8 wherein the third channel is formed on a front face of the elongated member.

10. An assembly comprising:
    an elongated member that can be detached and secured to a trough, the member having a receptacle disposed at least partially along a length thereof; and
    at least one retainer having a flange that fits in the receptacle for detaching and securing the retainer in the receptacle, wherein the elongated member is formed from resilient material.

11. The assembly of claim 10 wherein the resilient material comprises polyvinyl chloride (PVC).

12. A cable retainer assembly comprising:
    an elongated member having an S-shaped cross section defining first and second channels, the first channel being detachably securable to a wall of a cable trough; and
    a retainer having an L-shaped cross section, the retainer having a portion that can be detached and inserted in the second channel and slidable along at least a portion of a length thereof,
    wherein the elongated member and retainer are each formed from a resiliently deformable material.

13. A cable retainer assembly comprising:
    an elongated member having an S-shaped cross section defining first and second channels, the first channel being detachably securable to a wall of a cable trough; and
    a retainer having an L-shaped cross section, the retainer having a portion that can be detached and inserted in the second channel and slidable along at least a portion of a length thereof,
    wherein the elongated member further includes a means for detaching and securing a designation chart.

14. The assembly of claim 13 wherein the means for detachably securing a designation chart comprises a third channel.

15. An assembly comprising:
    a designation strip detachably securable to a trough, the strip having one of a channel and a flange; and
    a retainer including the other of a channel and a flange, the flange being received by the channel, the retainer being detachably securable to the designation strip and slidable along at least a portion of a length thereof.

16. The assembly of claim 15 further comprising a designation chart that can be detached and secured to the designation strip.

* * * * *